United States Patent [19]
Takashima

[11] Patent Number: 4,783,836
[45] Date of Patent: Nov. 8, 1988

[54] INFORMATION READING APPARATUS

[75] Inventor: Izumi Takashima, Ebina, Japan

[73] Assignee: Fuji Xerox Co., Ltd., Tokyo, Japan

[21] Appl. No.: 768,570

[22] Filed: Aug. 23, 1985

[30] Foreign Application Priority Data

Aug. 31, 1984 [JP] Japan .................................. 59-182935
Aug. 31, 1984 [JP] Japan .................................. 59-182936

[51] Int. Cl.⁴ ............................................. G06K 9/38
[52] U.S. Cl. ..................................... 382/50; 358/163; 382/54
[58] Field of Search .................... 358/163; 382/50, 51, 382/52, 53, 54

[56] References Cited

U.S. PATENT DOCUMENTS

| | | | |
|---|---|---|---|
| 3,800,078 | 3/1974 | Cochran et al. | 382/50 |
| 3,872,434 | 3/1975 | Duvall et al. | 382/50 |
| 4,128,830 | 12/1978 | Weythman | 382/50 |
| 4,355,228 | 10/1982 | Sama et al. | 358/163 |
| 4,520,395 | 5/1985 | Abe | 358/163 |
| 4,524,388 | 6/1985 | Abe et al. | 358/163 |
| 4,554,583 | 11/1985 | Saitoh et al. | 358/163 |
| 4,613,269 | 9/1986 | Wilder et al. | 382/18 |

OTHER PUBLICATIONS

Larson et al., *Calculus with Analytic Geometry*, page 320, 1980.

*Primary Examiner*—Leo H. Boudreau
*Assistant Examiner*—Joseph Mancuso
*Attorney, Agent, or Firm*—Handal & Morofsky

[57] ABSTRACT

In an information reading apparatus in which picture image data of manuscript read with a manuscript reader is converted into a digital signal including picture image data or shading correction reference density data of the manuscript, and the digital signal is converted into a logarithmic value. A memory device is used for storing the shading correction reference density data which has been converted into a logarithmic value and a subtractor is provided for subtracting data stored in the memory device at the time of no light input from picture image data and shading correction reference density data so as to effect a base level correction of the both data. A shading correction circuit is provided for effecting a shading correction based on the picture image data and the shading correction reference density data whose level have been corrected by the subtractor.

9 Claims, 5 Drawing Sheets

INFORMATION READING APPARATUS

BACKGROUND OF THE INVENTION

1. Field of the Invention

This invention relates to information reading apparatus utilized in a digital copying machine, facsimile device or the like and more particularly improved information reading apparatus capable of improving the accuracy of data read by manuscript reader such as a charge coupled device (CCD) image sensor.

2. Description of the Prior Art

In a conventional manuscript reading apparatus utilized in a digital copying machine, a facsimile device and the like, a manuscript written with a picture image, characters or the like is irradiated with light from a bar shaped light source, and the light reflected from the manuscript is inputted into such solid image sensor as the CCD or the like through an image pick-up lens for converting the inputted light signal into an electric signal. In such manuscript reading apparatus it is necessary to correct so-called shading characteristic caused by (1) decrease in the brightness from the central portion of the light source toward the end portion due to inequality in the light distribution characteristic of the light source, (2) decrease in the brightness of the lens near the peripheral portion thereof due to cosine four power rule (3) difference in the sensitivities of respective bits of the solid state image sensor and (4) contamination of a reflection mirror etc.

Figure 1:
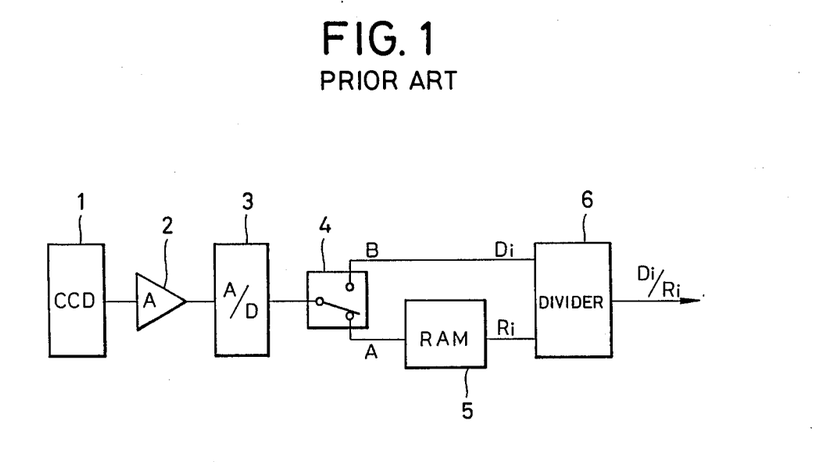
FIG. 1 is a block diagram showing a prior art information reading apparatus.

For this reason, various shading correction systems have been proposed, one example thereof being shown in FIG. 1.

Figure 2:
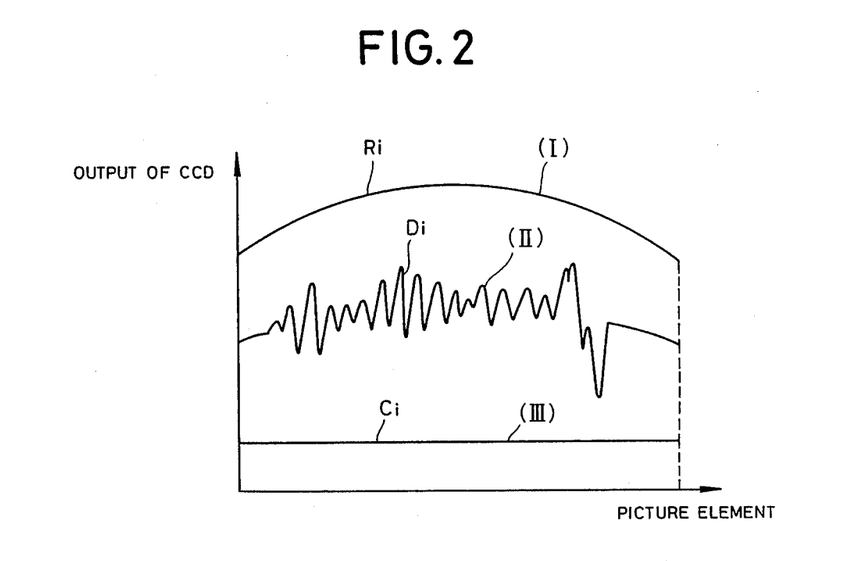
FIG. 2 shows the shading characteristic of a manuscript reading apparatus.

In a prior art apparatus shown in FIG. 1 and disclosed in Japanese Laid Open Patent Specification No. 19467/1984, at the time of the shading correction, a switch 4 is thrown to a contact A and light reflected from a white plate and utilized as a reference image density data for the shading correction is inputted to a solid state image sensor (CCD) 1. Curve I shown in FIG. 2 shows the output characteristic of the CCD 1 when the reference density data Ri is read. The reference density data Ri photoelectrically converted by CCD 1 is inputted into an amplifier as serial bits to be amplified. The output of the amplifier 2 is converted into a digital signal by an A/D converter 3. The resulting digital signal is written into a random access memory device (RAM) 5.

At the time of scanning the manuscript, the switch 4 is thrown to a contact B. The picture image data obtained by reading the manuscript is applied to one input terminal of a divider 6 through the A/D converter 3 to act as a divident. Curve II in FIG. 2 shows the output characteristic of CCD 1 when any manuscript is read. To the other input terminal of the divider 6 is applied the shading correction reference density data stored in RAM 5 as a divider Ri. Consequently, the divider 6 outputs a quotient Di/Ri thereby correcting the shading of the picture image data of the manuscript.

The shading correction data Ri and the picture image data Di of the manuscript read by the CCD image sensor contain a level, that is a base level Ci (shown by curve III in FIG. 2) which appears when no light is inputted into the CCD image sensor so that the true output levels of the data Ri and Di correspond to the differences between these data Ri and Di and the base level Ci.

For this reason, in the prior art, a true output value has been obtained by offsetting the base level by a fixed level in the amplifier 2.

With the prior art system, however, the reading accuracy of the CCD image sensor was degraded due to (1) variation of the offset voltage caused by temperature change, (2) variation in the offset voltage over a long period and (3) difference of the base levels of respective reading elements.

Figure 3:
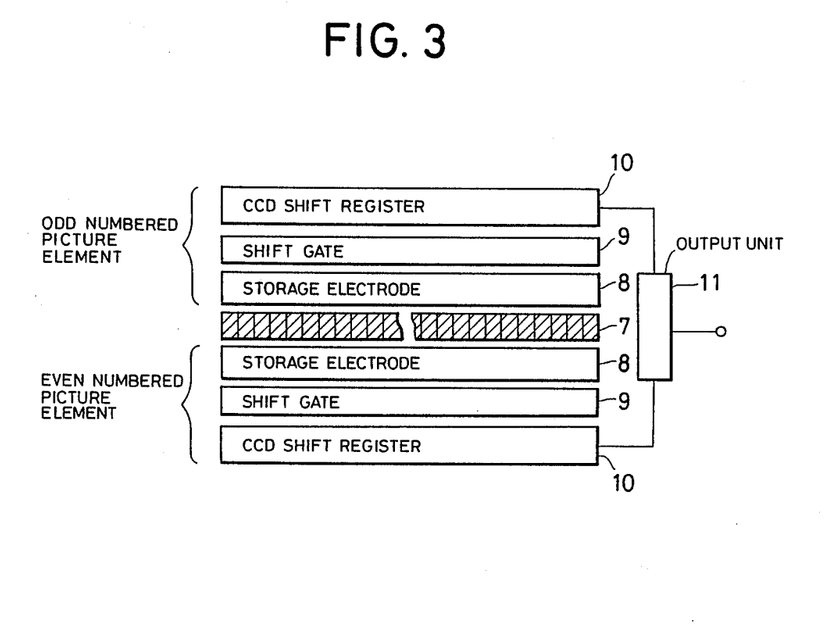
FIG. 3 is a diagrammatic representation showing the construction of an ordinary one dimensional CCD image sensor.

Further, where a one dimensional CCD image sensor shown in FIG. 3 is used as the manuscript reading apparatus, and where a conventional offset system utilizing an amplifier is used, there are the following defects.

That is, as shown in FIG. 3 the one dimensional CCD image sensor is constituted by a photoelectric converting element array 7, a storage electrode 8 for temporarily storing a resulting charge signal, a shift gate circuit 9 for parallelly transferring the stored signal charge to the CCD shift register 10, a CCD shift register 10 for serially transferring the transferred charge to an output unit and an output unit 11 for alternately converting the signal charges transferred from both shift registers 10 into voltage signals for producing a time series signal. While the signal charges of the odd and even numbered photoelectric converting elements 7 are transferred to independent shift registers 10 and then alternately read out at the output unit 11 as time series signals.

Figure 4:
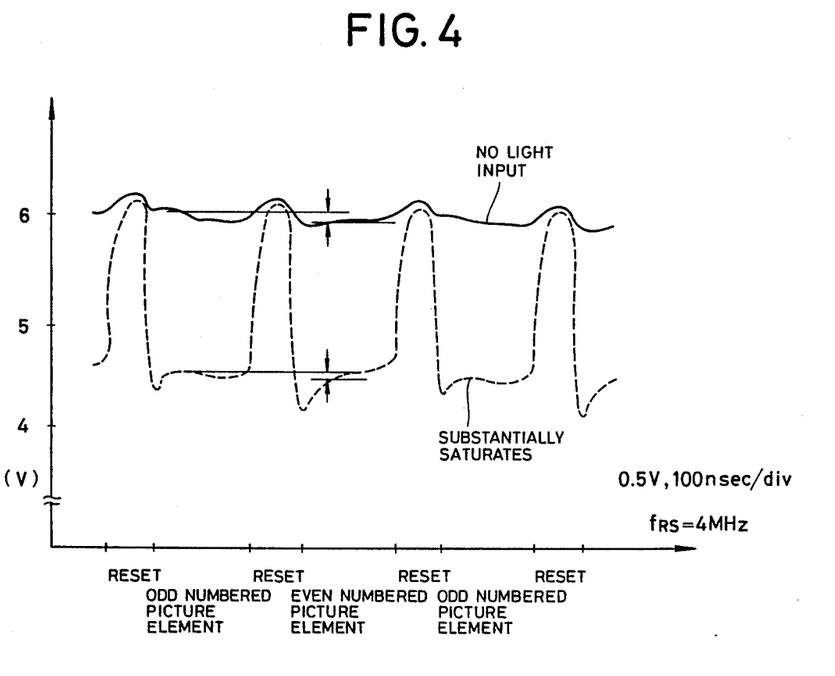
FIG. 4 is a graph showing the output voltage waveform of the one dimensional CCD image sensor.

FIG. 4 shows an output waveform of the output unit 11 obtained by synthesizing read out channels of the odd and even numbered picture elements. This output waveform was obtained when a 4 MHz reset pulse RS was applied for returning a floating capacitor in the output unit 11 to an initial state, the output waveform being superposed on a DC voltage of about 6V.

Considering the output waveform shown by a solid line obtained when no light was inputted, it will be noted that there are differences in the output waveforms and the output levels between the odd numbered channels and even numbered channels respectively. The difference thereafter increases to more then 0.05V depending upon the timing setting of A/D conversion.

The output waveform when the storage electrode 8 becomes substantially saturated is shown by broken line. Although the output level decreases about 1.3V compared with a case of no input light, at this time too, there are differences in the output waveforms and the output levels between the odd numbered and even numbered channels just as in the case of no light input. Although the output level has decreased by about 1.3V as compared to the case of no light input, in this case too, there are differences in the output waveforms and output levels between the odd numbered channels and the even numbered channels in the same manner as in the case of no light input.

As above described, in the one dimensional CCD image sensor irrespective of the difference in the dynamic ranges between the odd numbered and even numbered channels, according to the prior art system, the offset is made with the same base level. With such measure, the output signal of the CCD image would not be compensated for correctly so that such measure cannot be used in a reading apparatus required to reproduce the manuscript picture image at a high fidelity.

Furthermore, in the prior art apparatus shown in FIG. 1 where a device constituted by hard logic is used as the divider 6, since the number of calculation steps are large, the calculation takes a long time. Therefore as the circuit is elaborate, a read only memory is generally used as the divider in order to increase the calculating speed and simplify the circuit.

The memory content of the read only memory device (ROM) is selected such that when Di and Ri are inputted to the address terminal of the ROM, the ROM outputs a data Di/Ri or an approximate value thereof.

With this system, however, the number of bits required for the input address signal of the ROM is equal to the sum of the bit numbers of the input signals Di and Ri. Moreover, as there is a limit for the bit number of the output data of existing memory devices, where the bit numbers of the input signals Di and Ri are large the circuit construction becomes large and complicated. For example, assume that each of the input signals Di and Ri has 8 bits, the ROM is required to have an address of $2 \times 8 = 16$ bits and an output data of 8 bits. With this bit number, the memory capacity becomes 524K bits, thus complicating the circuit construction, increasing the cost of the apparatus and making it difficult to obtain a high operating speed.

SUMMARY OF THE INVENTION

Accordingly, it is an object of this invention to provide a novel information reading apparatus capable of reading at a high accuracy over a long period without requiring temperature compensation.

Another object of this invention is to provide an improved information reading apparatus capable of effecting a shading correction of a high speed operation with a simple circuit construction even when the number of bits of the data is large.

According to this invention there is provided information reading apparatus comprising manuscript reading apparatus for producing a photoelectrically converted analog signal; an A/D converter for converting the analog signal into a digital signal including a picture image data or a shading correction density data of a manuscript; memory means for storing the digital signal corresponding to the output data of the manuscript reading apparatus at the time of no light input; subtracting means for subtracting the data stored in the memory means at the time of no light input from the picture image data or the shading correction reference density data so as to effect a base level correction of the both data, and shading correction means for effecting a predetermined shading correction based on the picture image data and the shading corection reference density data of the manuscript, the base levels of both data having been corrected by the subtracting means.

DESCRIPTION OF THE PREFERRED EMBODIMENT

Figure 5:
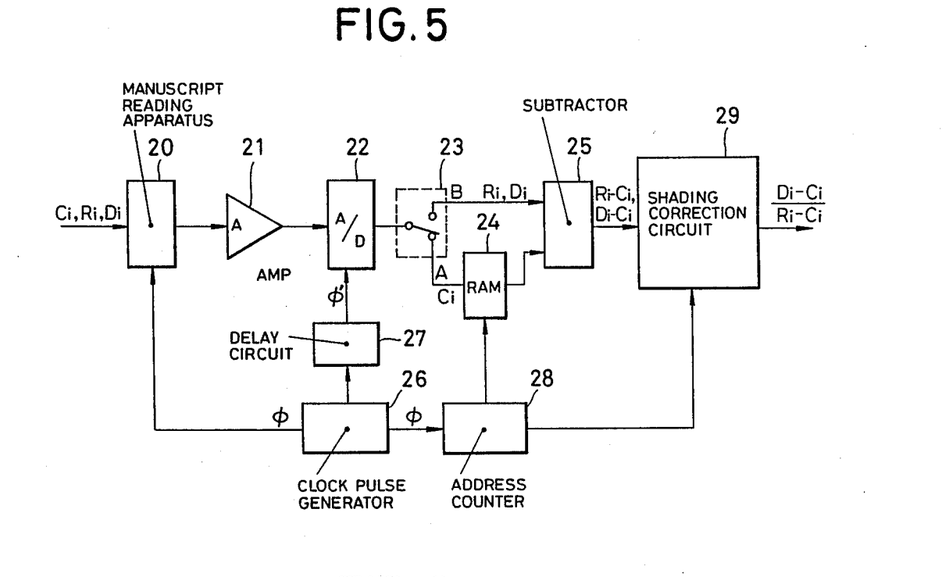
FIG. 5 is a block diagram showing one embodiment of this invention.

Referring now to FIG. 5 showing one embodiment of the information reading apparatus of this invention, a manuscript reading apparatus 20 is constituted by a solid state image pick-up device such as a CCD or the like and operates to photoelectrically convert and store received picture image data Di of an illuminated manuscript or a shading correction reference density data Ri and then supply the stored data to an amplifier in a bit serial mode in synchronism with a clock pulse generated by a clock pulse generator 26. The data, amplified by the amplifier 21 to a suitable level, is sequentially applied to an A/D converter 22.

The A/D converter 22 sequentially converts the output of the amplifier 21 into a digital signal constituted by n (positive integer) bits in accordance with a clock pulse $\phi'$ obtained by delaying the clock pulse $\phi$ with a delay circuit. In this embodiment it is assumed that the input data is decomposed into 8 bits, that is 256 levels of from 0 to 255.

A transfer switch 23 is provided for the purpose of transferring the output of the A/D converter 22 and its movable contact is thrown to contact A when the base level data Ci at the time of no light input is to be read whereas to contact B when the shading correction reference density data Ri and the picture image data Di of the manuscript are to be read. A RAM 24 is provided for the purpose of storing the base level data Ci at the time of no light input. The write and read operations are effected based on an address signal outputted from an address counter 28 which forms address signals for writing and reading RAM 24 by counting the number of clock pulses $\phi$ produced by the clock pulse generator 26.

A subtractor 25 is constituted, for example, by connecting in parallel two 4 bit adders and executes a calculating operation in which the base level data Ci (8 bits) which has been stored in RAM 29 is subtracted from the reference density data Ri (8 bits) outputted from the A/D converter through transfer switch 23 at the time of reading the shading correction data or the picture image data Di (8 bits) of the manuscript similarly outputted from A/D converter 22 at the time of reading the manuscript. The result of the subtraction operation is inputted to a shading correction device 29.

Figure 6:
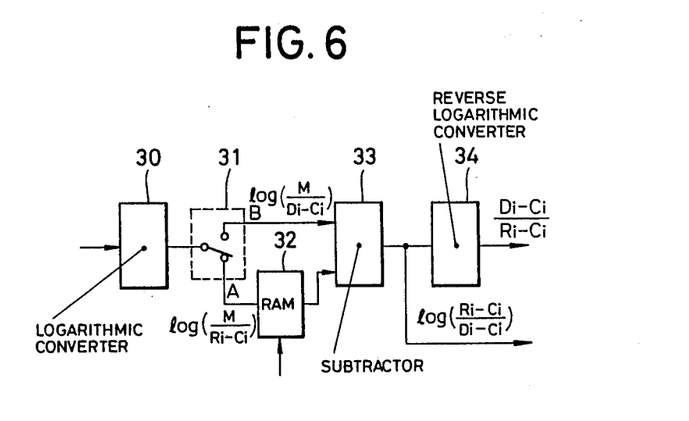
FIG. 6 is a block diagram showing the construction of the shading correction circuit shown in FIG. 1

One example of the construction of the shading correction device 29 is shown in FIG. 6.

Figure 7:
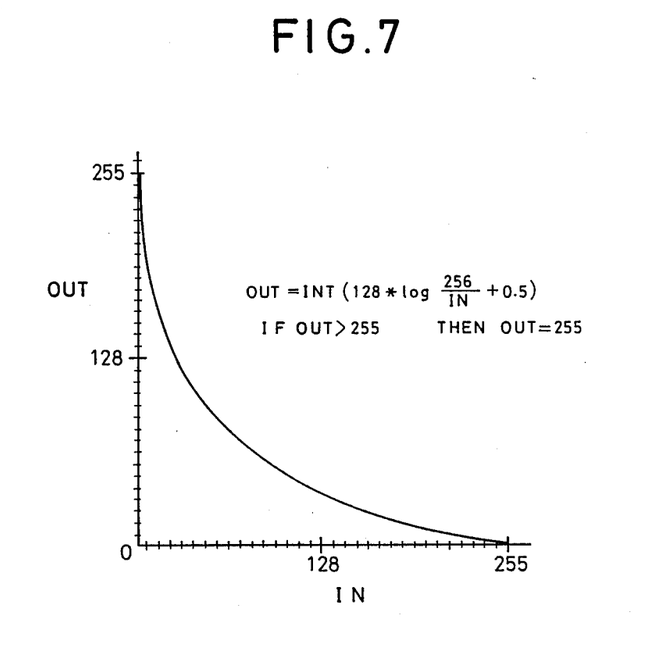
FIG. 7 shows one example of a conversion table set in a logarithmic converter.

It comprises a logarithmic converter 30 which converts data (Di-Ci) or (Ri-Ci) outputted from the subtractor 25 into a common logarithmic value log (M/(Di-Ci)) or $$\log \frac{M}{(Ri - Ci)}$$

corresponding to a predetermined reference setting value M, and one example of the logarithmic conversion table is shown in FIG. 7 in which the ordinate represents the output (OUT) and the abscissa represents the input (TN). In the logarithmic converter 30, a logarithmic conversion is effected according to the following equation.

$$OUT = INT\left(128 * \log\frac{256}{IN} \times 0.5\right)$$

when $OUT \geq 255$, $OUT = 255$ in which INT means an integer.

In this equation, fractions of 0.5 and over of the output data are counted as a whole number and the rests are disregarded. Where there is an input resulting in an output larger than 255, the output would be converged to the maximum digital value of 255. In this case, value 128 is set so that the output value (OUT) would correspond to digital values 0–255, but depending upon the type of the system, this value may be changed for varying the range of the density output.

In the example illustrated, the logarithmic converter 30 is constituted by a read only memory device (ROM) so as to increase the operating speed and to simplify the circuit construction. This object can be accomplished by setting the content of ROM such that when a digital value IN is inputted as the address signal of ROM 30 from subtractor 25, the output value (OUT) according to the above described equation would be produced. Where the output of the subtractor 25 comprises 8 bits, a high speed logarithmic conversion of the access time of about 50 n sec can readily be realized with a simple construction, for example, by using a general purpose ROM with an input address and output data being 8 bits each, or by using two general purpose ROMs each having a capacity of larger than 4 bits×256 words.

The purpose of a transfer switch 31 is to transfer the output of the logarithmic converter 30 and its movable contact is thrown to a contact A when the shading correction reference density data (Ri-Ci) is to be read, whereas to a contact B when the picture image data (Di-Ci) of the manuscript is to be read. A RAM 32 is provided for the purpose of storing the logarithmic value log [M/(Ri-Ci)] of the shading correction reference density data (Ri-Ci), and its writing and reading operations are performed in accordance with an address signal outputted from an address counter 28.

A subtractor 33 is constituted by connecting in parallel two general purpose 4 bit full address and operates to subtract the logarithmic value [M/(Ri-Ci)] (8 bits) of the reference density data which has been stored in RAM 32 from the logarithmic value log [M/(Di-Ci)] (8 bits) of the manuscript picture image data outputted from the logarithmic converter 30 via transfer switch 31 at the time of reading the manuscript. The result of the subtraction operation is inputted to a reverse logarithmic converter 34 which performs a reverse convertion of the logarithmic converter 34 for producing a shading correction data $$\frac{Di - Ci}{Ri - Ci}.$$

In operation, a light source (not shown) for supplying light to the manuscript reading device 20 is turned OFF for reading the base level data Ci when there is no light input. At this time, the transfer switch 23 is thrown to the contact A. The base level data Ci photoelectrically converted by the manuscript reading device 20 is inputted to the amplifier 21 in a bit serial mode to be amplified and then converted into a digital signal of 8 bits by the A/D converter 22, the digital signal thus obtained being sequentially stored in RAM 24 via the transfer switch 23.

At the time of reading the shading correction reference density data Ri, the transfer switch 23 is thrown to contact B, while the transfer switch 31 is thrown to contact A, and the manuscript reading device 20 is receiving light reflected from a white color plate utilized to obtain the reference density data Ri. The reference density data Ri photoelectrically converted by the manuscript reading device 20 is inputted to A/D converter 22 through the amplifier 21 to be converted into a 8 bit digital signal which is applied to one input of the subtractor 25 via the transfer switch 23. At this time, to the other input terminal of the subtractor 25 is supplied the base level data Ci stored in RAM 24, whereby the subtractor 25 performs a subtraction operation in which Ci is subtracted from Ri. Consequently, the subtractor 25 produces a true correction data (Ri-Ci) in which the base level Ci is subtracted from the shading correction data Ri for each picture element.

This shading correction data (Ri-Ci) is inputted to the logarithmic converter 30. The 8 bit shading correction data (Ri-Ci) inputted to the logarithmic converter 30 is converted into a logarithmic value according to the foregoing conversion equation, and the resulting 8 bit logarithmic value log [M/(Ri-Ci)] is sequentially stored in predetermined addresses of RAM 32 via the transfer 31. More particularly, the base level component Ci is subtracted from the shading correction reference density data Ri read by the manuscript reading apparatus in subtractor 25 and the difference is converted into a logarithmic value $$\log\frac{M}{Ri - Ci}$$

by the logarithmic converter 30 and the logarithmic value is stored in the RAM 32. At the time of reading the picture image data of the manuscript, the transfer switch 23 is thrown to contact B while the transfer switch 31 is thrown to contact B.

The picture image data Di of the manuscript is photoelectrically converted by the manuscript reading apparatus and then inputted to one input terminal of the subtractror 25 via the amplifier 21, the A/D converter 22 and the transfer switch in the same manner as above described. At this time, the base level data Ci stored in RAM 24 is supplied to the other input terminal of the subtractor 25 so that the subtactor subtracts Ci from Di. Thus, the subtractor 25 produces a true picture image data (Di-Ci) for each picture element corresponding to the difference between the picture image data Di of the manuscript and the base level component Ci.

In the same manner as above described, this true picture image data (Di-Ci) is converted into a logarithmic value $$\log\frac{M}{Di - Ci}$$

by the logarithmic converter 30, the logarithmic value being applied to one input terminal of the subtractor 33 via the transfer switch 31. At this time, data $$\log\frac{M}{Ri - Ci}$$

stored in RAM is supplied to the other input terminal of subtractor 33 so that it subtracts $$\log \frac{M}{Ri - Ci} \text{ from } \log \frac{M}{Di - Ci}.$$

Consequently, the subtractor 33 outputs a difference $$\log \frac{M}{Di - Ci} - \log \frac{M}{Ri - Ci}$$

which is equal to $$\log \frac{M \times (Ri - Ci)}{(Di - Ci) \times M} = \log \frac{Ri - Ci}{Di - Ci}$$

which means that the subtractor 23 produces logarithmic values of respective picture elements corrected with the base level and the shading.

The output of the subtractor 33 is applied to the reverse logarithmic converter 34 for obtaining a final output. Then the corrected data $$\frac{Di - Ci}{Ri - Ci}$$

can be obtained. However, it is possible to make the output of the subtractor 33 as the final output, so as to process the picture image signal by utilizing the density data $$\log \frac{Ri - Ci}{Di - Ci}$$

as it is.

In this manner, according to this invention, each time a manuscript is read the following operations are repeatedly executed.

(1) A reading operation of the photoelectrically converted detection output of each reading element at the time of no light input, (2) A reading operation of the shading correction reference density data, and a base level correction operation of the reference density data, and (3) A base level correction operation of the picture image data of the read out manuscript and the shading correction operation.

For this reason it is always possible to read the picture image at a high accuracy without being influenced by the difference in the base levels for respective reading elements.

In the shading correction circuit utilized in this invention, since the input signal to this circuit (in this case, Ri-Ci or Di-Ci) is converted into a logarithmic value, a predetermined shading correction can be made by a simple subtraction operation executed thereafter. For this reason, this shading correction circuit is not only unnecessary to incorporate a complicated and elaborate logic divider but also is not required to constitute the divider with a ROM having a large memory capacity. The subtraction operation can be made with a general purpose full adder. For example, where the number of bits of the data is selected to be 8, a high speed calculation is possible by using an 8 bit general purpose full adder or two 4 bit full adders respectively constructed with IC.

In the shading correction circuit utilized in this invention, the operation speed can be increased and the circuit can be simplified by using a ROM in which calculation results of logarithm are stored as the logarithmic converter 30. But different from a ROM in the conventional case which has been used as a divider, in the shading correction circuit of this invention, since the input address bit number of the ROM can be equal to the data bit number of the output, that is, (Ri-Ci) or (Di-Ci) of the subtractor 25, even when the number of bits in the data is large as in a case where the number of bits of both data are made to be 8 respectively, a high speed logarithmic conversion processing can be made with a simple construction, for example, by using the ROM having input/output data of 8 bits or two 4 bit×256 word ROMs.

In fact, where the number of data bits is large, the circuit construction of the logarithmic converter 30 and the subtractor 33 can be much simplified than the divider 6 utilized in the prior art circuit shown in FIG. 1.

Although in the foregoing embodiment the shading correction circuit as shown in FIG. 6 was used for increasing the operating speed and simplifying the construction of the shading correction circuit, it should be understood that the invention is not limited to the specific circuit illustrated and that other shading correction circuit having any desired construction may be used.

Furthermore in the shading correction circuit 29 shown in FIG. 6, a shading correction reference density data (Ri-Ci) and a manuscript picture image data (Di-Ci) respectively corrected in their reference levels were inputted but if desired the output of the A/D converter 22, that is data Ri and Di before correcting its base level can be inputted to the shading correction circuit 29.

In the foregoing embodiment, the reference level data and the shading correction data are renewed for respective manuscript by taking into consideration the change with time of the reference level of the image sensor and of the brightness level of a light source but where a high speed operation is desired the reference density data is written into RAM 22 only at the time of starting the apparatus and thereafter, the shading of a plurality of manuscript can be corrected based on the reference density data stored in the RAM. Alternatively, each time a predetermined number of manuscripts are read, the shading correction data may be renewed.

In the foregoing embodiment, the shading correction reference density data comprised a fixed level data obtained by light reflected from a white color plate, but since the reflected light level of the white portion of the manuscript is generally different in respective manuscripts, the shading corrected by using the white portions of the manuscript can be used as the reference density data for correcting the shading and by taking into consideration the difference in the white portions of respective manuscripts. In this case, the reference density data of each data may be written by using the reading time of the whole white portion at the top of each manuscript.

In the foregoing embodiment, the invention was applied to a CCD type image sensor made up of arrayed photoelectric converting elements, a storage electrode, a shift gate and a shift register, but the invention is also applicable to an apparatus in which a photomultiplier and a photodiode are moved in parallel with the scanning line for reading the picture image data of the manuscript. In this case, the output current of the photomultiplier corresponding to the quantity of light reflected from or transmitting through the manuscript is inputted to a logarithmic converter utilizing an operational amplifier to obtain the density data. However, the operational amplifier circuit is defective in that its temperature dependency is large and that the frequency range of the input signal is narrow. When the calculation of the density conversion is effected in the form of digital signals by using the apparatus of this invention, a logarithmic conversion can be made in which temperature compensation is not necessary and the frequency range is wide.

What is claimed is:

1. An information reading apparatus, comprising:
   (a) a manuscript reader for producing a photoelectronically converted analog signal;
   (b) an A/D converter for converting said analog signal into digital data including picture image data and shading correction reference image density data;
   (c) memory means for storing said digital data corresponding to the output of said manuscript reader with no light input to said manuscript reader;
   (d) subtracting means for subtracting said data stored in said memory means from both picture image data and shading correction reference density data so as to effect a base level correction of both said data; and
   (e) shading correction means for effecting a predetermined shading correction based on said picture image data and said shading correction reference density data, base levels of both data having been corrected by said subtracting means, said shading correction means comprising:
      (i) logarithmic converting means for converting an output signal of said subtracting means into a logarithmic value;
      (ii) other memory means for storing a shading correction reference density data of said logarithmic value, and
      (iii) other subtracting means for subtracting said logarithmic value of said shading correction reference density data stored in said other memory means from said picture image data converted into a logarithmic value by said logarithmic converting means.

2. The apparatus according to claim 1 wherein said shading correction means further comprises reverse logarithmic converting means for reversely converting a logarithmic output signal of said other subtracting means to a value before logarithmic conversion.

3. The apparatus according to claim 1 wherein said logarithmic converting means comprises memory means prestored with data utilized for said logarithmic conversion.

4. The apparatus according to claim 1 wherein said shading correction reference density data is obtained by light reflected from a white color plate.

5. The apparatus according to claim 1 wherein said shading correction reference density data is obtained by light reflected from a white portion of a manuscript.

6. The apparatus according to claim 1 wherein said data stored in said memory means and utilized to correct said base level is renewed each time one or more sheets of manuscript are read.

7. The apparatus according to claim 1 wherein said base level correction data stored in said memory means at the time of no light input is renewed each time said apparatus is started.

8. The apparatus according to claim 1 wherein said shading correction reference density data stored in said further memory means is renewed each time one or more sheets of manuscript is read.

9. The apparatus according to claim 1 wherein said shading correction reference density data stored in said other memory means is renewed each time said apparatus is started.

* * * * *